(12) United States Patent
Perozziello et al.

(10) Patent No.: US 10,642,068 B2
(45) Date of Patent: May 5, 2020

(54) PROCESS FOR CUSTOMIZING AN ACTIVE CONTACT LENS

(71) Applicant: Spy Eye, LLC, Los Gatos, CA (US)

(72) Inventors: Eric Anthony Perozziello, Discovery Bay, CA (US); Kuang-mon Ashley Tuan, Mountain View, CA (US); Edward John Palen, Corte Madera, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/647,134

(22) Filed: Jul. 11, 2017

(65) Prior Publication Data

US 2018/0017811 A1 Jan. 18, 2018

Related U.S. Application Data

(60) Provisional application No. 62/363,088, filed on Jul. 15, 2016.

(51) Int. Cl.
*G02C 7/04* (2006.01)
*G02C 11/00* (2006.01)
*B29D 11/00* (2006.01)

(52) U.S. Cl.
CPC ........ *G02C 7/047* (2013.01); *B29D 11/00038* (2013.01); *B29D 11/00826* (2013.01); *B29D 11/00942* (2013.01); *G02C 7/04* (2013.01); *G02C 11/10* (2013.01); *G02C 2202/08* (2013.01)

(58) Field of Classification Search
CPC .......... G02C 7/04; G02C 7/047; G02C 11/10; G02C 2202/08; B29D 11/00038; B29D 11/00057; B29D 11/00086; B29D 11/00807; B29D 11/00817; B29D 11/00826; B29D 11/00942
USPC ........................................ 351/159.74–159.77
See application file for complete search history.

(56) References Cited

U.S. PATENT DOCUMENTS

| | | | |
|---|---|---|---|
| 5,108,169 A | 4/1992 | Mandell | |
| 5,880,809 A * | 3/1999 | Lieberman | G02C 7/041 351/159.02 |
| 6,578,254 B2 | 6/2003 | Adams | |
| 8,485,662 B2 | 7/2013 | Collins et al. | |
| 8,579,434 B2 | 11/2013 | Amirparviz et al. | |
| 8,608,310 B2 | 12/2013 | Otis et al. | |

(Continued)

OTHER PUBLICATIONS

Fraunhofer IOF: Laserlithography on Plane and Curved Surfaces, undated, 1 page.

(Continued)

*Primary Examiner* — Marin Pichler
(74) *Attorney, Agent, or Firm* — Fenwick & West LLP

(57) ABSTRACT

A method for customizing active contact lenses, such as contact lens displays, for a plurality of wearers includes the following: Contact lens precursors are obtained for a plurality of wearers. The contact lens precursors include active electronics. The same contact lens precursors are used as a starting point to generate active contact lenses for many different individuals, but they are processed into active contact lenses that are customized for each individual wearer.

19 Claims, 3 Drawing Sheets

(56) References Cited

U.S. PATENT DOCUMENTS

| | | | |
|---|---|---|---|
| 8,632,188 B1* | 1/2014 | Gemoules | A61B 3/125 |
| | | | 351/212 |
| 8,721,074 B2 | 5/2014 | Pugh et al. | |
| 8,786,675 B2 | 7/2014 | Deering | |
| 8,960,898 B1 | 2/2015 | Etzkorn et al. | |
| 8,985,763 B1 | 3/2015 | Etzkorn | |
| 9,054,079 B2 | 6/2015 | Etzkorn | |
| 9,161,712 B2 | 10/2015 | Etzkorn | |
| 9,192,298 B2 | 11/2015 | Bouwstra | |
| 9,271,677 B2 | 3/2016 | Leonardi | |
| 9,282,920 B2 | 3/2016 | Ho | |
| 9,323,073 B2 | 4/2016 | Pugh et al. | |
| 9,389,434 B2 | 7/2016 | Jubin | |
| 9,884,180 B1 | 2/2018 | Ho | |
| 2002/0057416 A1 | 5/2002 | Streibig | |
| 2002/0159025 A1* | 10/2002 | Legerton | G02C 7/047 |
| | | | 351/159.1 |
| 2004/0135644 A1 | 7/2004 | Mizoguchi | |
| 2013/0308092 A1* | 11/2013 | Groisman | G02C 7/04 |
| | | | 351/159.04 |
| 2014/0098226 A1 | 4/2014 | Pletcher et al. | |
| 2014/0197558 A1* | 7/2014 | Linhardt | A61B 5/6821 |
| | | | 264/1.7 |
| 2014/0200424 A1 | 7/2014 | Etzkorn | |
| 2014/0211473 A1 | 7/2014 | Weidman | |
| 2015/0236223 A1 | 8/2015 | Moosburger | |
| 2015/0362752 A1 | 12/2015 | Linhardt | |
| 2016/0091737 A1* | 3/2016 | Kim | G02C 11/10 |
| | | | 351/158 |
| 2017/0168322 A1 | 6/2017 | Toner et al. | |
| 2017/0371184 A1 | 12/2017 | Shtukater | |

OTHER PUBLICATIONS

Paul, K.E. et al., "Patterning Spherical Surfaces at the Two-Hundred-Nanometer Scale Using Soft Lithography," Advanced Functional Materials, Apr. 2003, pp. 259-263, vol. 13, No. 4.

* cited by examiner

PROCESS FOR CUSTOMIZING AN ACTIVE CONTACT LENS

CROSS-REFERENCE TO RELATED APPLICATIONS

This application claims priority under 35 U.S.C. § 119(e) to U.S. Provisional Patent Applications Ser. No. 62/363,088, "Method for Manufacture of Contact Lens and for Forming Fine Features on an Arbitrary 3D Surface", filed on Jul. 15, 2016. The subject matter of all of the foregoing is incorporated herein by reference in its entirety.

BACKGROUND

An eye-mounted display has been proposed by Deering. See, e.g. U.S. Pat. No. 8,786,675, "Systems using eye mounted displays". One type of eye-mounted display is based on a tiny projector mounted inside a contact lens. The projector projects images through the cornea and lens of the eye onto the retina of a person wearing the contact. Other types of contact lenses that include active electronics are also possible.

It is desirable to manufacture these active contact lenses in high volumes. However, contact lenses preferably are also customized for each individual wearer. Manufacturing active contact lenses one at a time is prohibitively time-consuming, particularly given that the contact lenses contain active electronics.

Therefore, there is a need for methods to cost-efficiently produce active contact lenses customized to individual wearers.

FIGURES

DESCRIPTION

The following description uses an example of an active contact lens that is a display. However, the approaches disclosed are not limited to contact lens displays and can be applied to any type of active contact lens. In the following display example, small projectors mounted in the active contact lens project images onto the retina of the wearer. The images appear superimposed on the real view of whatever the person is looking at. The contact lenses typically also include other components not found in common contact lenses used only to correct vision: antenna(s) for data communication, antenna(s) or coils to receive power, possibly a battery to store power. Other components may include electronics for sensors, processing, power management, data storage, etc. Optoelectronics, such as LED light sources, may also be included as part of the projector.

Contact lens displays contain features that are common to all wearers and also features that are custom to each individual wearer. The custom features typically include the shape of the anterior surface, for example to provide the appropriate amount of refractive correction to the wearer, and the shape of the posterior surface, for example so that the contact lens fits correctly on the wearer's eye. The common features typically include the electronic and optical components that make up the image projection technology.

Figure 1:
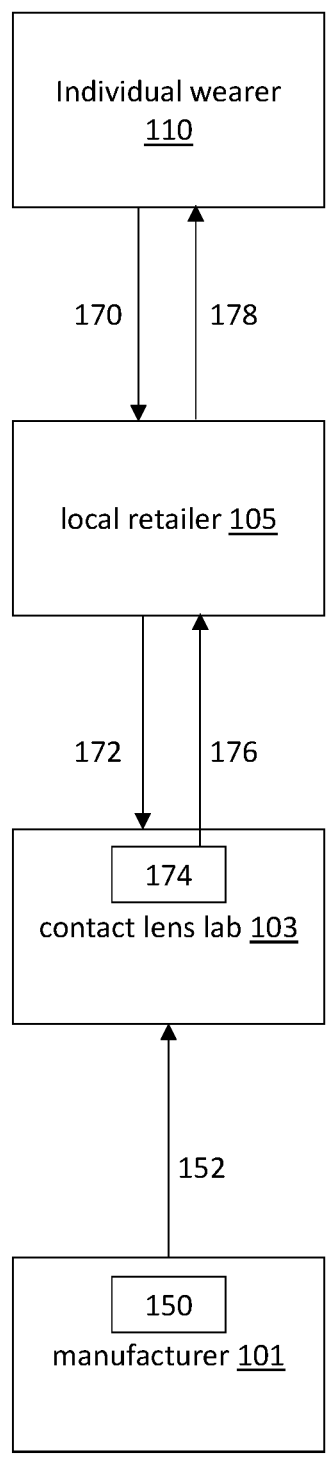
FIG. 1 illustrates a process for producing customized contact lens displays.

FIG. 1 illustrates a process for producing customized contact lens displays. This example involves a manufacturer 101, a contact lens lab 103, a local retailer 105 and an individual wearer 110. The manufacturer 101 produces 150 contact lens "precursors" or "blanks". These precursors or blanks are partially manufactured contact lens displays and preferably already include as many of the common features as is commercially feasible, but they have not yet been customized for a specific wearer 110. The precursors/blanks preferably contain much, if not all, of the active electronics and projector optics of the final contact lens display, so that these components can be manufactured and assembled by the manufacturer 101 rather than one at a time by the contact lens lab 103. As examples, precursors/blanks may include the projectors, light sources and other optoelectronics, projector optics, memory, electronics processing, antennas, coils and/or battery.

The wearer 110 orders 170 his contact lens display through the retailer 105, for example in conjunction with a visit to an eye care professional (ophthalmologist, optometrist, optician). However, the same final contact lens product cannot be used for all individuals. Typically, the contact lens product is customized both based on the shape of the wearer's eyeball and to provide the refractive correction, if any, appropriate for the wearer.

The retailer 105 obtains 170 from the wearer 110 information that specifies the wearer's customizations. Customization of the precursors/blanks is performed by the contact lens lab 103. The lab 103 obtains 152 precursors from the manufacturer 101. The lab 103 also receives 172 orders from the retailer 105. Based on the information provided by the retailer 105, the lab 103 processes 174 each contact lens precursor into a contact lens display customized for a specific user. The customized contact lens display is shipped 176 to the retailer 105, who provides 178 it to the wearer 110.

With respect to customization, users preferably will have the shape of the posterior surface of their contact lens display (i.e., the surface closer to the eye) optimized for the shape of their eyeball. This prevents the contact lens from slipping with respect to the eyeball. The customization may be expressed as a radius of curvature or, more likely, a more complicated map of eyeball shape or desired shape of the posterior surface. Examples of more complicated maps include an elevation map and a point cloud of the eyeball shape. If a contact lens display is based on a scleral contact lens, the contact lens preferably is shaped to rest upon and conform to a person's sclera and to arch over their cornea with a small gap, preferably not more than about 100-200 microns. The lens is comfortable to wear because it does not touch the sensitive cornea.

In one approach, the posterior surface of the contact lens is divided into annular zones, each of which may have a different radius of curvature. The retailer provides the radial boundaries and radius of curvature for each zone. Table 1 below gives an example in which the posterior surface is divided into 5 zones.

TABLE 1

Description of posterior surface of contact lens

| Zone | Inner and outer radii of zone | Lens radius of curvature |
|---|---|---|
| 1 | 0.0 mm to 4.0 mm | 7.5 mm |
| 2 | 4.0 mm to 5.7 mm | 7.78 mm |
| 3 | 5.7 mm to 6.6 mm | 8.7 mm |
| 4 | 6.6 mm to 7.1 mm | 12.75 mm |
| 5 | 7.1 mm to 7.5 mm | 14.25 mm |

Zone 1 extends from the center to a radius of 4 mm and has a radius of curvature of 7.5 mm, zone 2 extends from a radius of 4 mm to a radius of 5.7 mm and has a radius of curvature of 7.78 mm, and so on. Different numbers of zones can be used, but preferably between two and ten zones.

A scleral contact lens is often made from rigid gas permeable material. This is special plastic that is engineered to be permeable to oxygen. It is often referred to as "RGP". Another possible material choice is PMMA (poly methyl methacrylate; i.e. acrylic or Plexiglas). If the blank is based on RGP or PMMA, the posterior surface of the blank can be machined on a lathe. The shape of the posterior surface need not be symmetric, since modern lathes can make shapes that are not rotationally symmetric. They do this by moving the cutting point axially in synchronization with rotation of the part being cut.

The shape of the anterior surface of the contact lens (the surface farther from the eye) preferably is shaped to provide a refractive vision correction, if necessary. The anterior shape can be formed by machining on a lathe or by compression molding a material such as silicone. Both spherical and cylindrical refractive corrections may be provided. If compression molding is used to form the anterior surface, then only one mold per prescription is needed. For example, 429 mold shapes are needed to cover the range from −4.0 to +4.0 diopters of spherical correction (in 0.25 diopter increments) with +0.0 to +3.0 diopters of cylindrical correction (in 0.25 diopter increments) for each spherical value.

FIGS. 2-3 illustrate various processes for customizing contact lens displays.

Figure 2A:
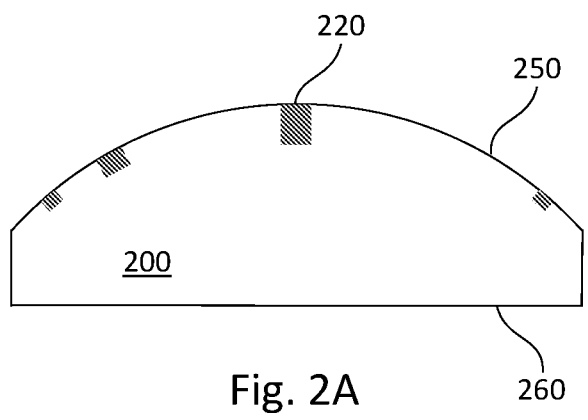
FIG. 2A illustrates a contact lens precursor.
Figure 2B:
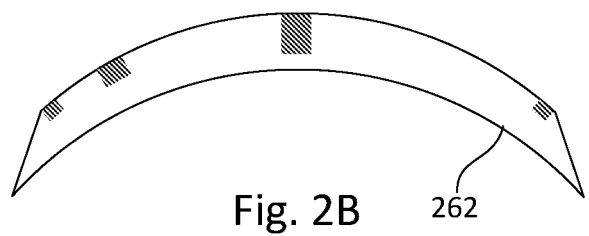
FIG. 2B illustrates the contact lens precursor of FIG. 2A, with shaping of the posterior surface.
Figure 2C:
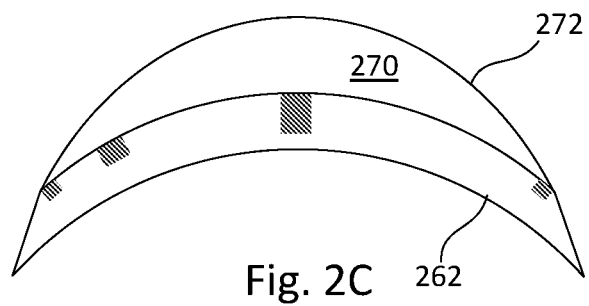
FIG. 2C illustrates the contact lens precursor of FIG. 2B, with overmolding of the anterior surface.

FIG. 2A shows a contact lens precursor 200 containing active electronics 220, for example optoelectronics. In the figure, the different gray boxes represent different electronics, although only one is labelled for clarity. For a contact lens display based on tiny projectors, the electronics 220 preferably includes the projectors. In some applications, the electronics 220 include cameras, possibly in addition to projectors. In this example, the electronics 220 are embedded in the anterior surface 250. The posterior surface 260 is flat. The body of the active lens blank 200 may be made from RGP, PMMA, a similar plastic or a combination of materials. In FIG. 2B, the posterior surface 262 is shaped to fit the wearer's eyeball. For example, this may be done on a lathe. The posterior surface 262 is now the posterior surface of the finished contact lens product. In FIG. 2C, a material 270, for example silicone, is molded or cast to form the anterior surface 272 of the finished contact lens product. In one approach, compression molding is used.

Figure 3A:
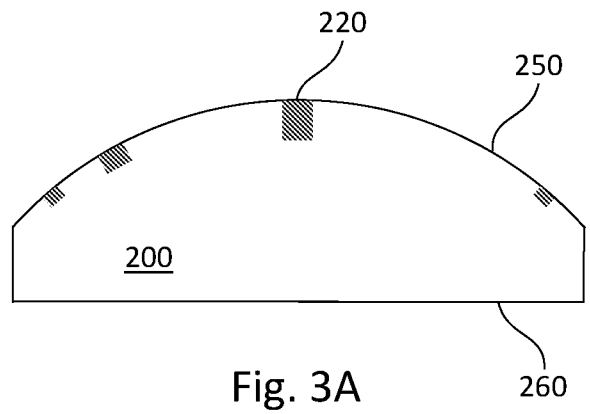
FIG. 3A illustrates a contact lens precursor.
Figure 3B:
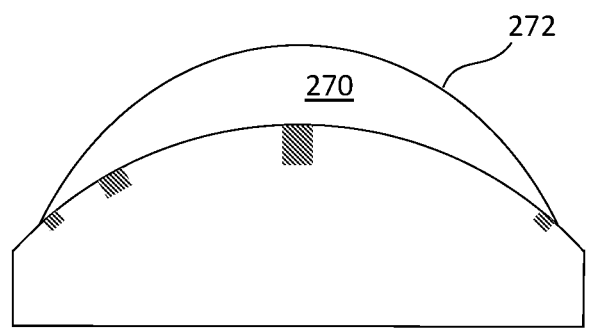
FIG. 3B illustrates the contact lens precursor of FIG. 3A, with overmolding of the anterior surface.
Figure 3C:
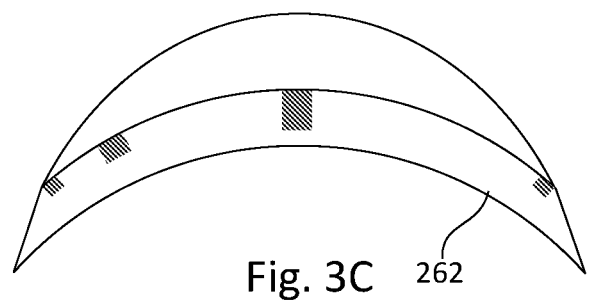
FIG. 3C illustrates the contact lens precursor of FIG. 3B, with shaping of the posterior surface.

FIG. 3 illustrates a process similar to that of FIG. 2, but with the last two steps reversed. FIG. 3A shows a contact lens precursor 200 as in FIG. 2A. In FIG. 3B, a material 270 such as silicone is molded or cast to form the anterior surface 272 of the finished contact lens product. The posterior surface 262 of the active lens blank is then shaped, as shown in FIG. 3C. One advantage of this approach is that when the anterior surface 272 is molded, the moldable material 270 may leak from the anterior side around to the posterior side. The machining process that shapes the posterior side may be used to scrape away or clean up any material that has leaked around.

In an alternate approach, molding or casting may be used to form both the anterior surface and the posterior surface.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for customizing scleral contact lens displays for a plurality of wearers, each scleral contact lens display comprising a scleral contact lens containing a projector that projects images onto a retina of an individual wearer's eye, the method comprising:

obtaining contact lens precursors for the plurality of wearers, each contact lens precursor including the projector that projects images onto the retina of the individual wearer's eye, wherein the contact lens precursors are the same for the plurality of wearers; and processing the contact lens precursors into scleral contact lens displays customized for each individual wearer, comprising:

custom shaping a posterior surface of the contact lens precursor to rest upon and conform to a shape of each individual wearer's sclera, wherein the scleral contact lens arches over the individual wearer's cornea when resting upon the individual wearer's sclera and the custom shape of the posterior surface resting upon the individual wearer's sclera prevents the scleral contact lens from slipping with respect to the individual wearer's eye and prevents the images projected by the projector from slipping with respect to the individual wearer's retina.

2. The method of claim 1 where the contact lens precursor includes all of the electronics and optical components of the final contact lens display.

3. The method of claim 1 where the contact lens precursor further includes a camera.

4. The method of claim 1 where the contact lens precursor includes a coil and/or an antenna.

5. The method of claim 1 where the contact lens precursor includes a battery.

6. The method of claim 1 where a body of the contact lens precursor is made out of a rigid gas permeable material.

7. The method of claim 1 where processing the contact lens precursors comprises processing the contact lens precursors to produce refractive vision correction customized for each individual wearer.

8. The method of claim 7 where processing the contact lens precursors comprises shaping anterior surfaces of the contact lens displays to produce refractive vision correction customized for each individual wearer.

9. The method of claim 8 where shaping the anterior surfaces comprises molding or casting the anterior surfaces.

10. The method of claim 8 where shaping the anterior surfaces comprises shaping the anterior surfaces by machining on a lathe.

11. The method of claim 1 where custom shaping the posterior surfaces comprises custom shaping the posterior surfaces by machining on a lathe.

12. The method of claim 1 where the contact lens precursors are obtained by a contact lens lab from a manufacturer of the contact lens precursors, and processing the contact lens precursors is performed by the contact lens lab.

13. The method of claim 1 where the images projected by the projector appear superimposed on a real view of the individual wearer.

14. The method of claim 1 where the custom shape of the posterior surface for each individual wearer is expressed as a set of annular zones and a radius of curvature for each zone.

15. The method of claim 1 where the custom shape of the posterior surface for each individual wearer is expressed as an elevation map of a shape of the individual wearer's eye.

16. The method of claim 1 where the custom shape of the posterior surface for each individual wearer is expressed as a point cloud of a shape of the individual wearer's eye.

17. The method of claim 1 where the custom shape of the posterior surface for each individual wearer is not limited to symmetric shapes.

18. The method of claim 1 where the custom shape of the posterior surface for each individual wearer further arches over a cornea of the individual wearer's eye without contacting the cornea.

19. The method of claim 18 where the custom shape of the posterior surface for each individual wearer arches over the cornea with a gap of not more than 100 microns.

* * * * *